US012441585B2

(12) United States Patent
Wenlin et al.

(10) Patent No.: US 12,441,585 B2
(45) Date of Patent: Oct. 14, 2025

(54) ELEVATOR SYSTEM WITH METHOD OF POSITION DETECTION OF A CAR

(71) Applicant: KONE Corporation, Helsinki (FI)

(72) Inventors: Henri Wenlin, Helsinki (FI); Juha Panula, Helsinki (FI); Oskari Perälä, Helsinki (FI); Niko Forsström, Helsinki (FI); Sami Janhunen, Helsinki (FI); Juha-Matti Aitamurto, Helsinki (FI); Tarvo Viita-aho, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1325 days.

(21) Appl. No.: 17/136,732

(22) Filed: Dec. 29, 2020

(65) Prior Publication Data

US 2021/0214188 A1     Jul. 15, 2021

(30) Foreign Application Priority Data

Jan. 9, 2020   (EP) ..................................... 20150907

(51) Int. Cl.
    *B66B 5/00*        (2006.01)
    *B66B 1/34*        (2006.01)
               (Continued)

(52) U.S. Cl.
    CPC .......... *B66B 5/0031* (2013.01); *B66B 1/3407* (2013.01); *B66B 1/3461* (2013.01);
               (Continued)

(58) Field of Classification Search
    CPC ... B66B 5/0031; B66B 1/3407; B66B 1/3461; B66B 1/3492; B66B 5/0025; B66B 11/02; B66B 15/02; F16H 55/36; G01D 5/244
    See application file for complete search history.

(56) References Cited

U.S. PATENT DOCUMENTS

2013/0025977 A1*   1/2013   Korhonen ............ H02K 11/215
                                                       187/394
2013/0228400 A1*   9/2013   Terry ...................... B66B 1/285
                                                       187/394

(Continued)

FOREIGN PATENT DOCUMENTS

EP          3 353 108       8/2018
EP          3 366 627 A1       8/2018
(Continued)

OTHER PUBLICATIONS

European Search Report issued in EP 20150907.2, dated Jul. 10, 2020.

*Primary Examiner* — Shafiq Mian

(74) *Attorney, Agent, or Firm* — Birch, Stewart, Kolasch & Birch, LLP

(57) ABSTRACT

A rope pulley of an elevator system is a free rotating pulley around which a hoisting rope of the elevator system can be guided. The free pulley is to be mounted to a car sling of an elevator car. The pulley includes an encoder for measuring the rotation movement of the pulley. The movement data are transmitted to a controller that converts the movement data into position data of the car in the hoistway, while further position data are gathered from identification markers that are installed in the hoistway. At least, the movement data of the rope pulley(s) are calibrated based on the position data from the identification markers. Thereby, the position of the car in the hoistway can be determined accurately and costly.

17 Claims, 2 Drawing Sheets

Figure 1:
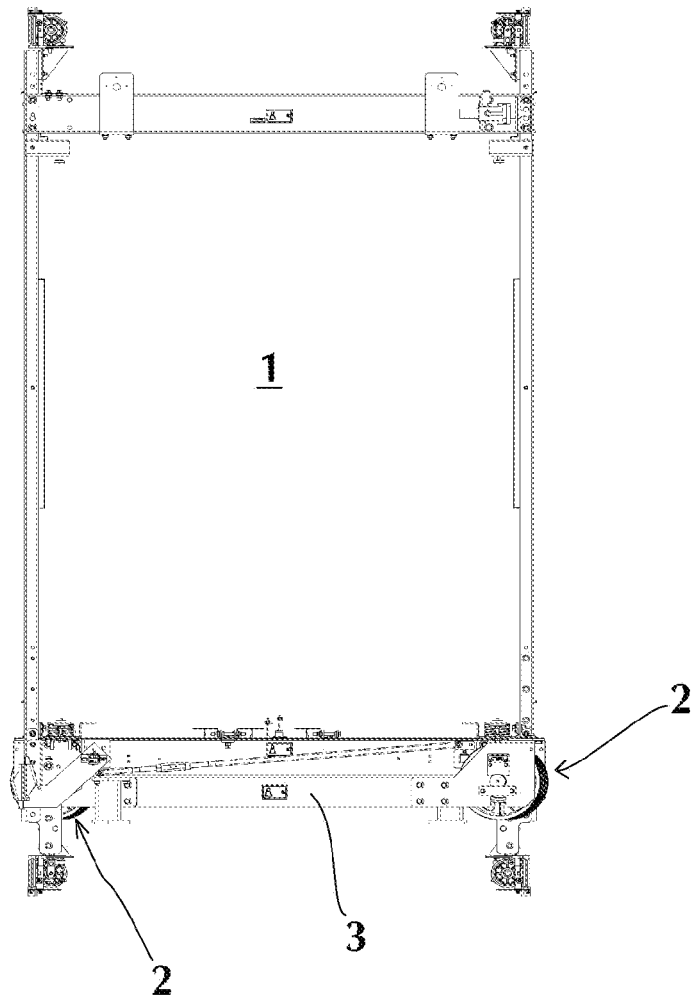

(51) Int. Cl.
 B66B 11/02 (2006.01)
 B66B 15/02 (2006.01)
 F16H 55/36 (2006.01)
 G01D 5/244 (2006.01)

(52) U.S. Cl.
 CPC .......... B66B 1/3492 (2013.01); B66B 5/0025 (2013.01); B66B 11/02 (2013.01); B66B 15/02 (2013.01); F16H 55/36 (2013.01); G01D 5/244 (2013.01)

(56) References Cited

U.S. PATENT DOCUMENTS

2013/0283907 A1    10/2013  Kang et al.
2015/0014098 A1*   1/2015   Stolzl ........................ B66B 1/32
                                                         187/394
2019/0055107 A1    2/2019   Michel et al.

FOREIGN PATENT DOCUMENTS

JP        2014-510959 A      5/2014
WO    WO 2017/050857 A1      3/2017

* cited by examiner

ELEVATOR SYSTEM WITH METHOD OF POSITION DETECTION OF A CAR

FIELD OF THE INVENTION

The present invention relates to the technical field of elevators and in particular to a positioning system that outputs data of the position of an elevator car.

BACKGROUND OF THE INVENTION

An elevator system comprises at least one elevator car traveling along a hoistway between a plurality of landings. In order to allow for a safe operation of the elevator system, it is necessary to reliably determine the current position of the elevator car within the hoistway. For example, determining the current position of the elevator car within the hoistway with good accuracy is necessary for positioning the elevator car at the landings without a noticeable step between the respective landing and the floor of the elevator car. Such a step would constitute a trap hazard for passengers entering and leaving the elevator car.

For this reason, elevators are traditionally provided with reed switches that are mounted to the elevator car while permanent magnets are provided along the travel path in the hoistway. These magnets are disposed such that a reed switch can react to an adjacent magnet when the car has arrived to a specific location in the elevator shaft.

Such specific locations are, for example, elevator landing positions, when the car floor is flush with the landing floor. Additionally, safety switches or mechanical ramps are disposed in selected locations, such as near end terminals of the elevator shaft, to determine extreme limits for an allowable elevator car movement in the shaft.

In prior art, it is known from document EP3366627A1 to monitor the elevator car position in the elevator shaft with electronic monitoring means comprising a position sensor that can be an acceleration sensor of a car or a position sensor switch which interacts with markers installed along a wall of the hoistway.

Motor control is another example scenario to determine the car position. The position information regarding motor components is useful for either controlling the motor itself, but it is also useful for determining positions of other components that move responsive to an operation of the motor. Such a solution is for example disclosed in JP2014510959.

A problem with these solutions is, among others, that they may be unreliable since mechanical switches are prone to wear. Further, the current solutions require an enormous amount of installation and maintenance work, since the position of the permanent magnets in the hoistway may change unintentionally or a manual adjustment is needed.

Further, in case of a modernization or preventive maintenance of an elevator plant only some parts have to be replaced and in a lot of cases it is even not the motor included to be exchanged so that the motor control is no solution for preventive maintenance at all.

AIM OF THE INVENTION

It is an object of the present invention to provide an elevator system and a method of evaluating the position of an elevator car in an elevator system which allow reliably determining the current position of the elevator car within a hoistway with good accuracy, while the positioning system saves investment costs.

SUMMARY OF THE INVENTION

By means of the present invention a new kind of measuring apparatus for measuring the position of an elevator car is introduced. This new measuring device is a rope pulley as claimed in the annexed claim 1. The latter is modified with respect to convenient embodiments according to the subordinate claims referenced thereto. Further, there is an elevator system according to claim 5 encompassing said rope pulley. At least, there is included a method as elucidated in claim 6. Here again, preferred embodiments are subject of subordinate claims, respectively.

Taking first reference to the invented rope pulley, the same acts as a position measurement device configured to transmit data for measuring or calculating the absolute linear position data of the elevator car within the elevator hoistway. Said rope pulley is a free rotating pulley around which a hoisting rope of the elevator system is to be guided around for deflecting the rope into a specific direction. According to a convenient embodiment, the rope pulley can be mounted to the car of the elevator so that as soon as the car moves in the shaft, the pulley synchronously rotates with this movement. As an alternative, the pulley can be a stationary pulley installed in the shaft.

An encoder belonging to the pulley detects the rotational movement of the pulley and transmits the rotational data to a controller. From the rotational measurement the controller can calculate the distance the rope passed via the pulley when taking into account the diameter of the pulley and the controller can also calculate a speed of the pulley's rotation. Further, when integrating these speed data, the rolling length can also be mathematically verified by integration. By means of that rolling length of the pulley in turn the movement length of the car can be calculated—and therewith, the position of the car in the shaft can be determined.

By using this innovation one can achieve an accurate car position measurement in an elevator shaft with a flexible, cost efficient and robust design.

According to a convenient embodiment, the encoder is a magnetic encoder. In this case, the rope pulley comprises a magnetic band or magnetic ring that is mounted on a rotating shelf of the pulley, while a magnetic reader is stationary mounted, for example in a frame part of the pulley or at the beam at which the pulley is mounted to. Therewith, the encoder can pursue the revolution of the pulley by reading the passing magnetic band. The magnetic band is coded in a way, to be able to identify incrementally the circumference of the pulley's shelf. A resolution of this identification is to be set in dependency of the accuracy needed for determining the pulley's rotational position.

Other alternative solutions for the encoder are any other suitable rotating encoder, such as optical encoder, capacitive encoder or hall effect encoder. It is also possible to make a toothing (cogging) to the metallic surface of the rope pulley in the rotating direction of the pulley, and then measure this toothing with an inductive proximity sensor or sensors. As regards this solution showing the toothing on pulleys side, the pattern is preferably made by casting. When the pulley rotates, said toothing passes the inductive proximity sensor(s) causing a pulsating sensor signal, which indicates the movement of the elevator car.

The concept of letting a pulley as described above overtake the determination of the position of the car is based on that the positioning data of the pulley can be synchronized with markers that are arranged at a wall of the hoistway to for example identify a landing door zone. Taking these markers into consideration aids for the determination of the current position of the elevator car within the shaft, since the data as transmitted by the pulley can be correlated each time when the elevator car passes one of such markers in the shaft. According to an example, a marker can be positioned at each landing, respectively. This combination of encoder and markers realizes that the position of the car can be known during the movement of the car between two markers, while the recalibration gains a correction—if needed—to adjust the position data when passing an absolute marker position.

As a kind of markers, there can be door zone magnets. These are indicator strips mounted on landing door zones. They provide a vertical measurement range of approximately 20 to 30 cm. In this case, the elevator car is equipped with a reader device reading form the magnets the linear position of the elevator car with respect of the landing, respectively. The elevator car position outside of the landings can be measured with the encoder, wherein said measurement information is focused/synchronized with the door zone magnets.

To transmit the data of the encoder, the elevator car is provided with a safety bus node, which is connected to an electric safety controller via a data bus (safety bus) which is guided along with the trailing cable. The reader of the encoder is connected to the bus node such that movement data of the encoder is transferred to the safety controller. The position measurement arrangement as including above elucidated components is thus designed to match the high safety level of the electronic safety controller, such as for example Safety Integrity Level 3 (SIL3) in accordance with the norm EN81-20; IEC 61508.

According to a convenient embodiment, there are two or more rope pulleys that simultaneously provide data for the determination of the car's position. Therewith, a reciprocal comparison of the data of all encoders can be performed to increase reliability of safety level of the device. In a convenient embodiment, there are two rope pulleys mounted to a single elevator car. Both these rope pulleys output data of their measurements to the safety controller, respectively, wherein the data are compared with each other and correlated with the signals of the identification marker(s). If there is a fault condition detected between the two pulleys, a self-diagnostic method can be started that checks whether both rope pulleys do run at the same speed. By means of such self-diagnostic it can be further evaluated whether there is an abnormal rope slippage on a rope pulley or maybe a rope-pulley-bearing broken. It is further possible to cross-check the data as coming from the pulley-positioning system with the data as coming from the motor rotation speed encoder. Such an analysis enables to detect for example broken ropes or an atypical rope slip. Said analysis can also lead to a determination of any unintended car movement from a landing level or a detection of a car bouncing due to rope flexibility.

In detail, when the elevator car is starting its run at a floor level the current car's location is outputted to the positioning system. As soon as there is a movement of the car along the shaft, there is a movement of the diverting pulley being incrementally shifted in its rotation and automatically synchronised with the car's movement. Based on that a rope slippage on the diverting pulley is minimal, the car movement can be accurately calculated by utilizing the diverting pulley's diameter. However, as soon as there is some wear of the rope pulley during its lifetime, which wearing can affect its diameter value, there is a compensation of this phenomenon possible since by the nature of the invention, there can be a zeroing or calibration of the car position value in every start phase from a door level because of the identification marker(s) installed in the shaft. This means that a constant deviation or error in the data as output from the rope pulley will be corrected by adapting the diameter value of the rope pulley accordingly in the memory of the safety controller. By monitoring these data, one can monitor the diverting pulley's wear and in response thereto trigger service needs for it.

All in all, the present invention shows the following benefits:

It needs only a short installation time when comparing to other absolute positioning systems This system can be used to measuring also other condition and monitoring related quantities The system is also measurable already at factory when other systems will be calibrated and tested at site It shows a cost-efficient design There is no need of an end-to-end shaft length measuring system It enables a highly accurate car position and movement measurement The Location of the pulley underneath of the car is well protected The positioning device is easily accessible for maintenance and inspection No shaft length limitations by this design In the following, the invention is elucidated by means of an embodiment as shown in the drawings. In these, FIG. 1 is a view of parts of an elevator car with a rope pulley mounted according to the invention FIG. 2 shows details of the rope pulley according to the invention; one detail is a plan view whereas the other one is a sectional view.

FIG. 1 shows a sling 1 of an elevator car. At its bottom there is a pulley beam 3 at which there are mounted two rope pulleys 2 via which a hoisting rope (not shown) for the suspension of the car is guided. Both of these rope pulleys 2 are provided with an encoder. As there are two rope pulleys with encoders, respectively, a reciprocal comparison of the encoder information is performed to increase the reliability of safety level of the arrangement for determining the position of the car within the shaft.

Figure 2:
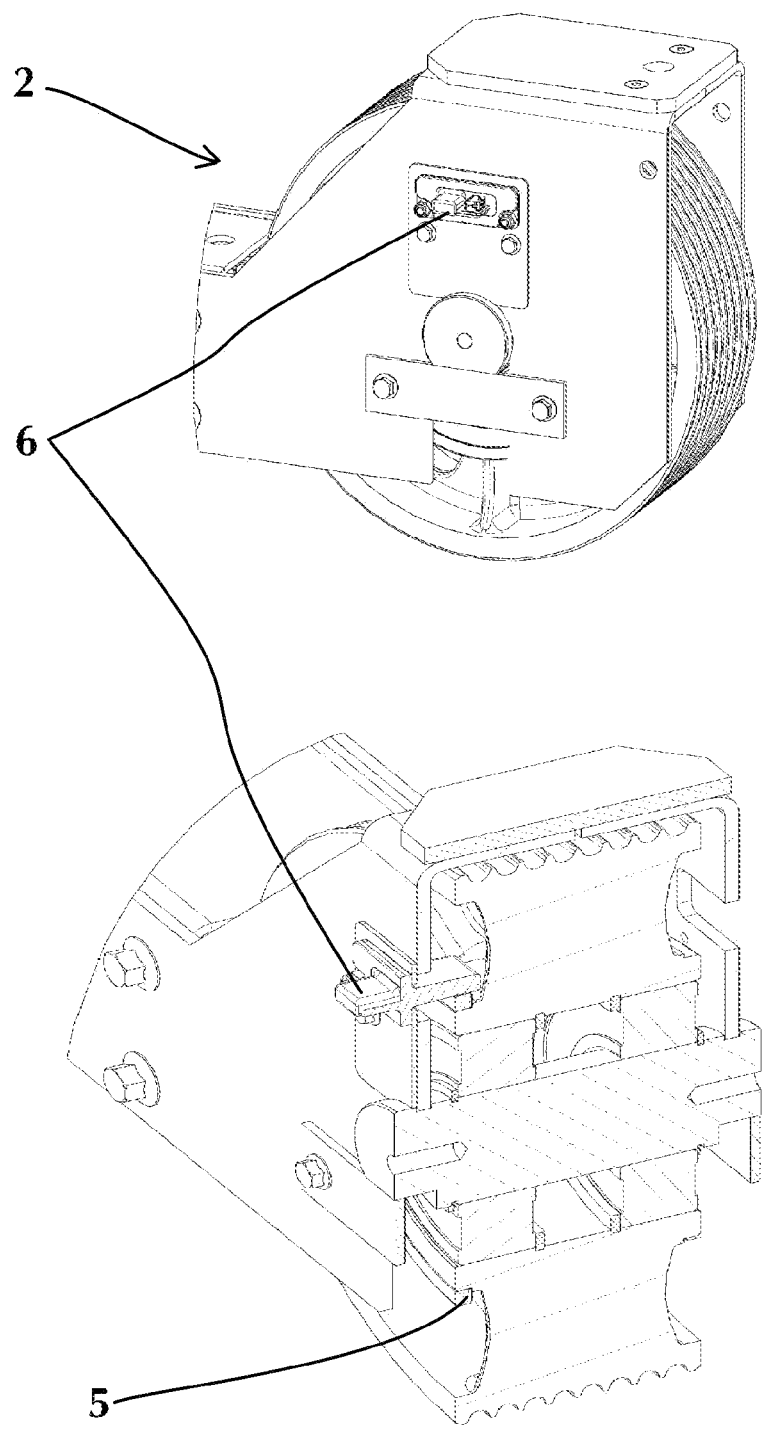

The encoder is preferably a magnetic encoder, as shown in FIG. 2. It comprises a magnetic band 5 mounted on a shelf of the rope pulley 2. A reader 6 is mounted in a hole of the pulley beam 3.

The elevator car is provided with a safety bus node, which is connected to an electric safety controller via a data bus, i.e. safety bus, which is included in the trailing cable. The reader 6 is connected to the bus node such that movement data of the encoder is transferred to the safety controller.

The invention claimed is:

1. An apparatus comprising:
a rope pulley of an elevator system, the rope pulley being a free rotating pulley around which a hoisting rope of the elevator system is guided, wherein the free pulley is mounted to a car sling of an elevator car of the elevator system;
an encoder attached to the rope pulley, the encoder measuring the rotation movement of the pulley as movement data: and
a controller communicatively connected to the encoder, the controller receiving the movement data from the encoder and processing the movement data to caculate position of the elevator car in a hoistway of the elevator system, wherein the controller controls movement of the elevator car on the basis of the calculated position.

2. The apparatus according to claim 1, wherein the encoder is a magnetic encoder, for which the rope pulley comprises a magnetic band mounted on a rotating shelf of the pulley, whereas a magnetic reader of the encoder is mounted stationary.

3. The apparatus according to claim 1, wherein the magnetic reader is stationary mounted to a pulley frame or to a pulley beam.

4. The apparatus according to claim 1, wherein the magnetic encoder comprises a connector for connecting the magnetic encoder to a bus node such that movement data of the encoder can be transferred to the controller.

5. An elevator system comprising:
an elevator car with a car sling;
a positioning arrangement that detects a position of the elevator car within a hoistway having several landings; and
the apparatus according to claim 1,
wherein the rope pulley is mounted to the car sling.

6. The apparatus according to claim 2, wherein the magnetic reader is stationary mounted to a pulley frame or to a pulley beam.

7. The apparatus according to claim 2, wherein the magnetic encoder comprises a connector for connecting the magnetic encoder to a bus node such that movement data of the encoder can be transferred to a safety controller.

8. The rope pulley according to claim 3, wherein the magnetic encoder comprises a connector for connecting the magnetic encoder to a bus node such that movement data of the encoder can be transferred to a safety controller.

9. An elevator system comprising:
an elevator car with a car sling;
a positioning arrangement that detects a position of the elevator car within a hoistway having several landings; and
at least one of the rope pulleys according to claim 2,
wherein the rope pulley is mounted to the car sling.

10. An elevator system comprising:
an elevator car with a car sling;
a positioning arrangement that detects a position of the elevator car within a hoistway having several landings; and
at least one of the rope pulleys according to claim 3,
wherein the rope pulley is mounted to the car sling.

11. An elevator system comprising:
an elevator car with a car sling;
a positioning arrangement that detects a position of the elevator car within a hoistway having several landings; and
at least one of the rope pulleys according to claim 4,
wherein the rope pulley is mounted to the car sling.

12. The apparatus according claim 2, wherein the encoder or a reader device in the apparatus gathers position data from identification markers that are installed in the hoistway; and
wherein the controller calibrates the movement data of the at least one free rope pulley based on the position data from the identification markers.

13. The apparatus according to claim 3, wherein the encoder or a reader device in the apparatus gathers position data from identification markers that are installed in the hoistway; and
wherein the controller calibrates the movement data of the at least one free rope pulley based on the position data from the identification markers.

14. The apparatus according to claim 4, wherein the encoder or a reader device in the apparatus gathers position data from identification markers that are installed in the hoistway; and
wherein the controller calibrates the movement data of the at least one free rope pulley based on the position data from the identification markers.

15. The apparatus according to claim 1, wherein the encoder or a reader device in the apparatus gathers position data from identification markers that are installed in the hoistway, and
wherein the controller calibrates the movement data of the encoder based on the position data from the identification markers.

16. A method for evaluating the position of a car of an elevator system, the method comprising:
gathering rotational movement data of at least one free rotating rope pulley by an encoder, a hoisting rope of an elevator car being guided around the at least one free rotating rope pulley, wherein the free rotating rope pully is mounted to a car sling of he elevator car or installed in a hoistway, the encoder being a part of the free rotating pully that measures the rotation movement of the free rotating pully;
transmitting said movement data to a controller that converts the movement data into position data of the car in the hoistway;
gathering further position data from identification markers that are installed in the hoistway; and
calibrating the movement data of the at least one free rope pulley based on the position data from the identification markers.

17. The method according to claim 16, further comprising performing a correction of the diameter value of the rope pulley as laid down in a memory of the controller, when a continuous error between the positioning data of the rope pulley compared to the positioning data of the identification markers occurs.

* * * * *